Feb. 24, 1959 A. E. R. ARNOT 2,874,861
AIRCRAFT MANOEUVRING APPARATUS
Filed March 7, 1956 4 Sheets-Sheet 1

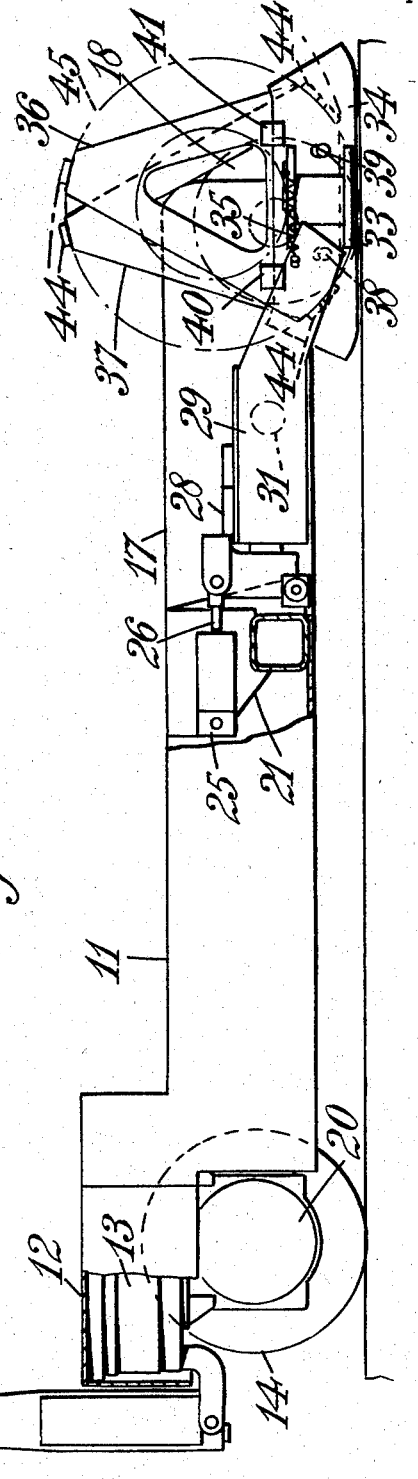

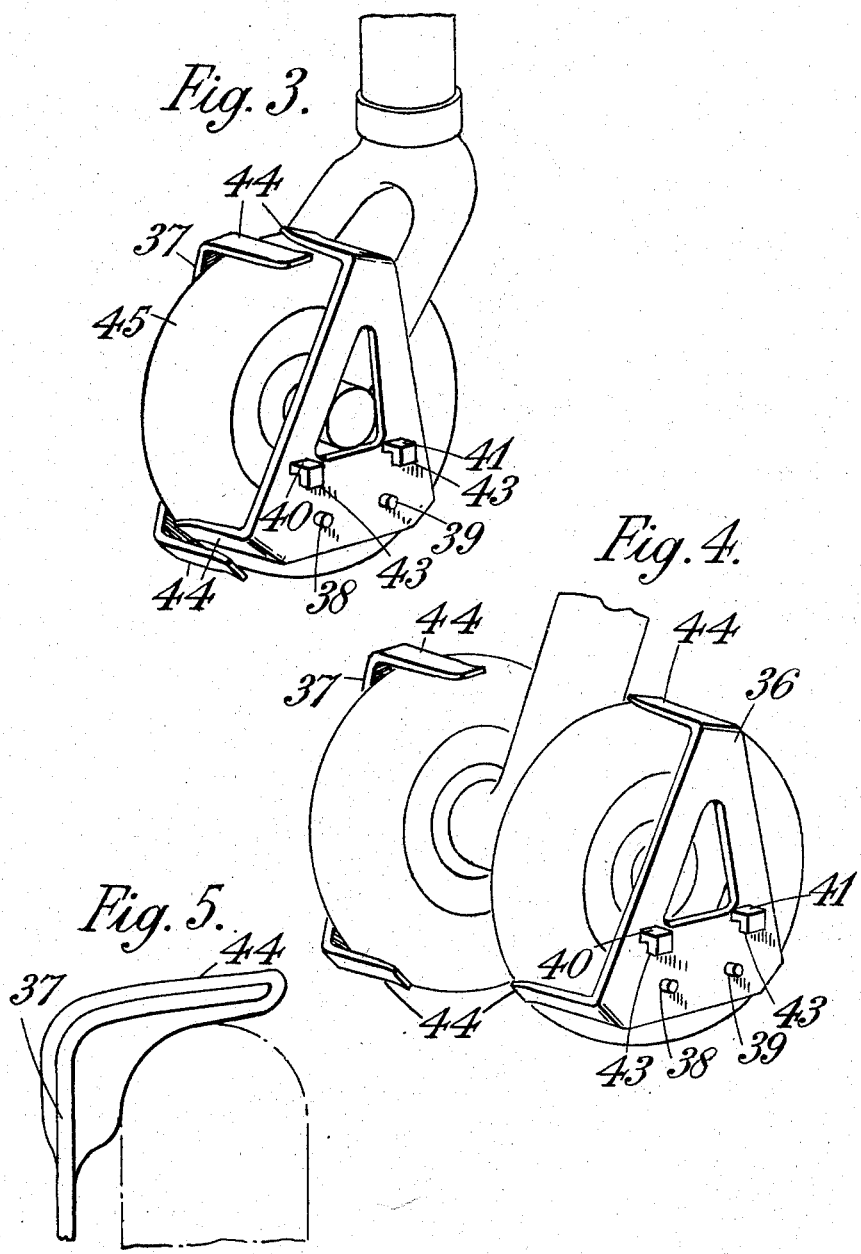

United States Patent Office 2,874,861
Patented Feb. 24, 1959

2,874,861

AIRCRAFT MANOEUVRING APPARATUS

Alfred Erwin Reginald Arnot, Basingstoke, England, assignor to John Reginald Sharp and Emanuel Kaye, Basingstoke, England Application March 7, 1956, Serial No. 570,005

Claims priority, application Great Britain March 9, 1955

5 Claims. (Cl. 214—332)

This invention comprises improvements in or relating to aircraft manoeuvring apparatus.

It is already known to provide an aircraft handling device consisting of a low trolley having a steering wheel at the rear end and forwardly projecting lateral arms which carry wheels on fixed axes at the front ends, the space between the arms being provided with a device to engage and support an undercarriage steering wheel of an aircraft and lift it clear of the ground. It has been proposed to engage the undercarriage steering wheel by means of a ring which is provided with a seating for the wheel and which fits on to a bracket on the trolley in such a way that the ring can rotate relatively to the bracket when it has been lifted, with the wheel clear of the ground. This obviates the necessity of the aircraft wheel effecting any steering movements when the trolley is caused to move round by swinging its outer end tangentially about the aircraft wheel as a centre. One of the objections to such a construction, however, is that the ring is not positively secured to the trolley but rested there by its own weight, the ring being free to lift out of its mounting on the trolley and the wheel free to lift out of its mounting on the ring. It is an object of the present invention to overcome these difficulties and to provide a practical construction.

In United States patent application Serial Number 544,780 there is described another construction of trolley in which the undercarriage steering wheel of an aircraft, instead of being engaged by means of a ring on a seating on the trolley, is engaged by universally mounted gripper arms. The present invention relates to particular means for holding the trolley to the aircraft undercarriage in such a manner that the two cannot become detached while the aircraft is being manoeuvred.

According to the present invention, gripper jaws are provided which are shaped to engage the tire of the wheel of an aircraft undercarriage by movement laterally from the sides thereof and to extend over the top of the tire so that upward movement of the tire relative to the gripper jaws is prevented when the grippers have engaged.

In a preferred form of gripper jaws according to the invention, the jaws are attached to the means for supporting them upon the trolley in such a manner as to permit of a limited freedom of movement relative to their supporting means. Each jaw may consist of a triangular main portion having three lateral extensions for the points of the triangle, the spacing of the lateral extensions from one another being such as to correspond approximately with the external diameter of the aircraft tire which is to be engaged.

The following is a description by way of example of certain constructions in accordance with the invention in the accompanying drawings:

Figure 2 is a side elevation of the same showing the front part of one side of the trolley broken away with a view to displaying the construction of the gripper jaws;

Figure 3 is a perspective view of an aircraft wheel showing the way in which the jaws engage the wheel;

Figure 4 shows another form of aircraft undercarriage having two wheels and shows how the same jaws can grip the alternative form of undercarriage;

Figure 5 is a detail;

Figure 1:
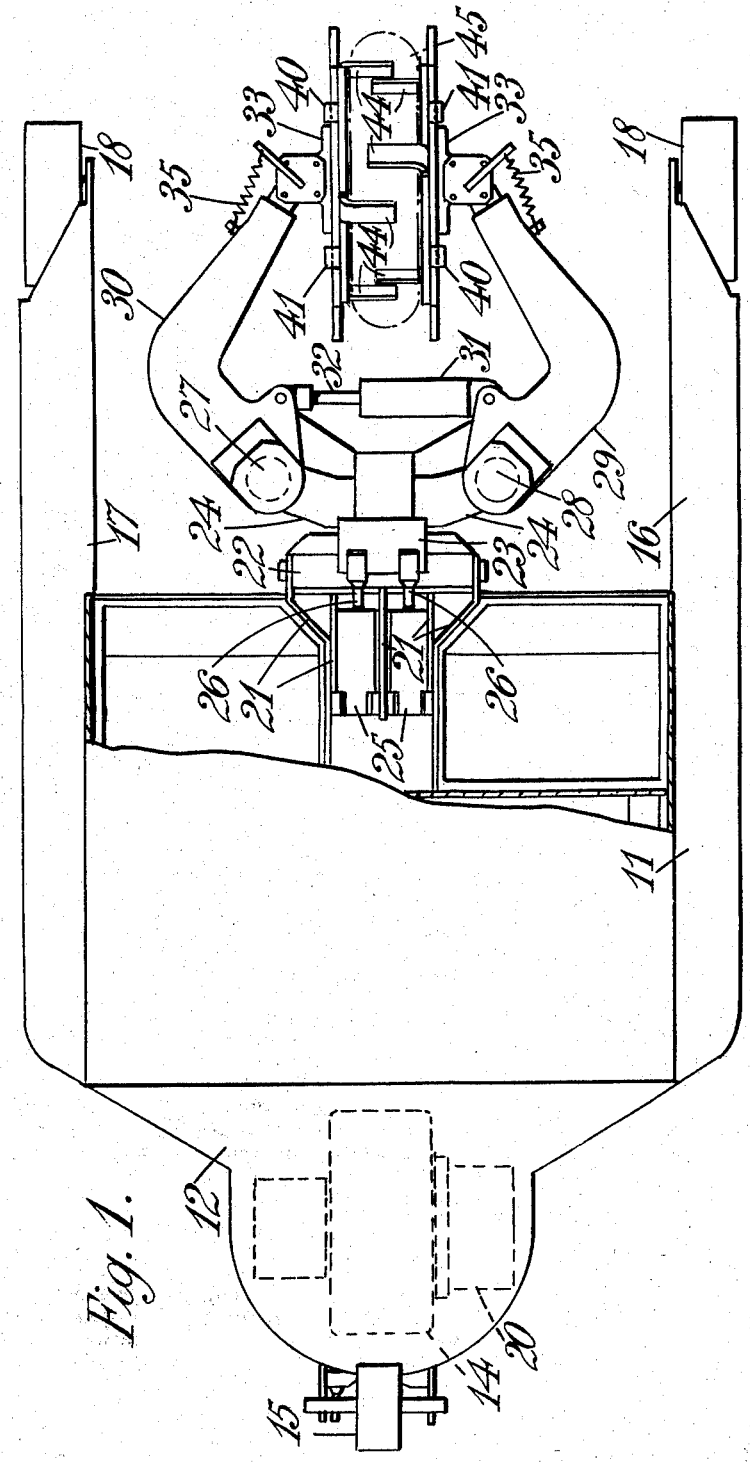
Figure 1 is a plan of a trolley fitted with gripper jaws in accordance with the invention.

Referring to the construction shown in Figures 1 and 2, this shows a trolley having a chassis 11 having a rear platform 12 beneath which is mounted a turntable 13 carrying a rear steering and driving wheel 14. The steering and driving wheel is controlled by a tiller 15 and is driven by an electric motor 20. From the sides of the chassis there project forwardly side members 16, 17 having stub-axles at their front ends on which are mounted low ground wheels 18. Between the side members 16, 17 there extends a tubular cross member 19 welded to vertical web plates 21 which stand up from it at intervals. To the web plates 21 there is pivoted a square rocking shaft 22 to which is welded a block 23 carrying a tilting yoke 24. The block 23 and yoke 24 can be canted by means of fluid-pressure cylinders 25 pivoted between the plates 21 and provided with rams 26 pivoted to the top of the block 23. On the yoke 24 there are pivoted at 27, 28, two gripper arms 29, 30. The gripper arms can be drawn together or spread apart by means of a fluid-pressure cylinder 31 pivoted to the arm 29 and carrying a ram 32 pivoted to the arm 30. On the front ends of the gripper arms there are pivoted brackets 33 which support gripper plates 34. The brackets 33 are connected to the gripper arms 29, 30 by springs 35 which tend to bias them so as to be open towards their front ends when they are not engaging an object which has to be gripped. The plates 34 are normally in a vertical plane. It will be seen that the cylinder 31 can be operated to bring the gripper plates 34 together and that the cylinders 25 can be operated to lift the gripper arms about the axis of the shaft 22.

Detachable triangular jaws 36, 37 are provided for attachment, one to each gripper plate 34. Each of the jaws 36, 37 (shown best in the perspective, Figure 3) comprises a vertically extending metal plate on the back of which are two pegs 38, 39 to enter loosely into two spaced apertures on the gripper plate 34. At a higher level at the back of each plate are two saddle elements 40, 41 which are intended to fit over the top edge of one of the gripper plates 34 and sustain the weight of the jaw thereon. The saddle elements 40, 41 take the form of angle shaped members which are welded in place and which extend horizontally outward from the back of the gripper arm and then each has a flange 43 which extends downwardly from the horizontal portion. The result is that the plate can be dropped over the top longitudinal edge of the gripper plate 34 with the flanges 43 behind the same and the two pegs 38, 39 on the back of the plate below the saddles can enter loosely into the holes in the face of the gripper arm. The pegs 38, 39 prevent undue fore and aft movement as well as up and down movement and the saddle elements 40, 41 take the weight.

The jaws 36, 37 each have three lateral projections 44 which are formed by turning their corners over so that they stand parallel with one another in an inward direction, that is to say a direction away from the inner face of the gripper arm. These lateral projections occupy the corners of a triangle on each jaw. The exact shape of each jaw 36, 37 is made to suit the aircraft undercarriage wheel forks. The spacing of the lateral projections 44 should be such that the jaw and projections approximately fit over the tread of an undercarriage tire as shown at 45. Both gripper plates 34 being provided with similar jaws, in the case of an undercarriage wheel having a single tire, the tire is gripped from both sides between the plates with its tread inside the lateral projections of the two jaws. It will be noted that the jaws are asymmetrical with relation to the vertical plane through the wheel axis, so that the projections 44 miss one another.

When the trolley is to deal with an aircraft undercarriage wheel of a different size, this can be simply and almost instantaneously provided for by simply changing the jaws 36, 37 with their lateral projections for another pair of jaws of a different size. The lateral projections may, if desired, be lined with rubber 50, bonded in situ as shown in Figure 5, and the rubber lining may also be carried around edges of the jaws and over the outside thereof. This tends to prevent pressure from the grippers damaging any parts of the aircraft undercarriage with which the grippers may come in contact.

When an undercarriage is to be dealt with of the type in which there are two tires on stub-axles at the bottom of a shock absorber leg, the two jaws can still operate, substantially as already described, but one gripper plate will engage one tire from one side of the undercarriage leg and the other jaws will engage the other tire from the other side of the leg, as shown in Figure 4.

Figure 6:
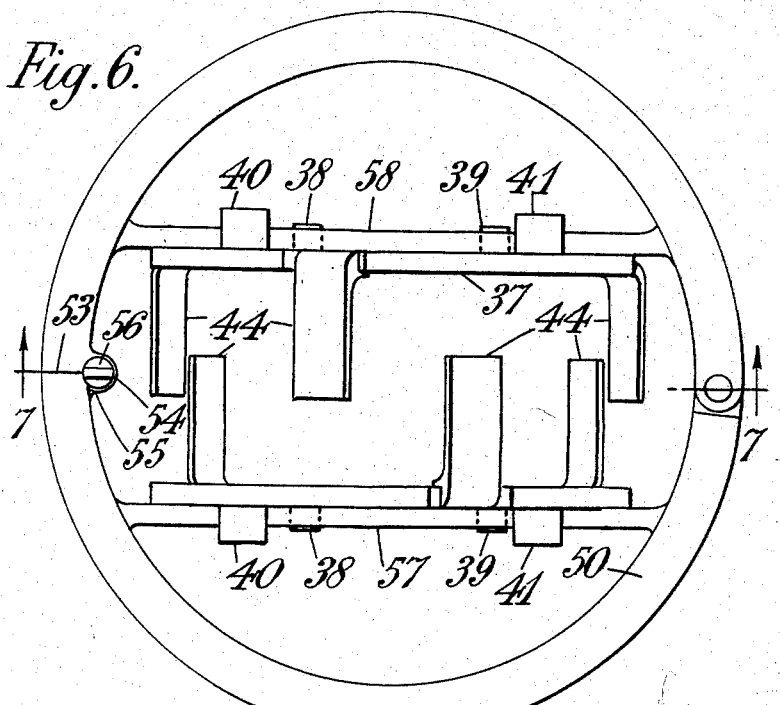
Figure 6 is a plan of an alternative construction.
Figure 7:
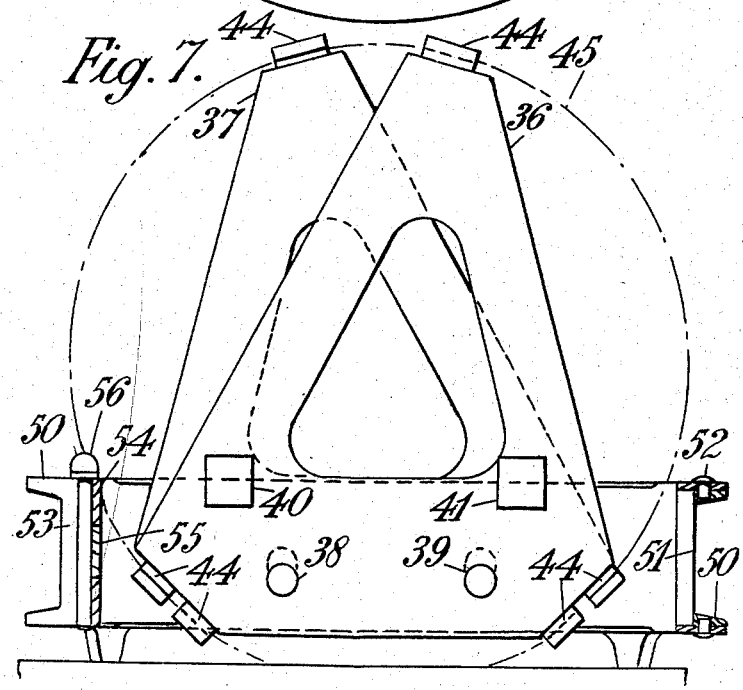
Figure 7 is a vertical section of the construction shown in Figure 6 taken upon the line 7—7 of Figure 6.

Alternatively the grippers may be carried upon a horizontal ring made in two halves and adapted to rotate in a ring-shaped holder held in the gripper arms as shown in Figures 6 and 7.

In Figure 6 there is a ring 50 which has a channel-shaped rim as shown at 51 Figure 7 and which is divided into two portions hinged together on one side at 52 and connected on the other side where there is a joint 53 by lugs 54 on one half of the ring which overlie lugs 55 on the other half and are connected together by a drop-in pin 56. Each half of the ring has a web running across it which forms a cord to its circumference, the two webs being shown in Figure 6 at 57, 58. The webs are parallel with one another and are sufficiently spaced apart to allow the tire of an aircraft undercarriage wheel to enter between them, all as more fully described in copending United States patent application Serial Number 570,007. The webs 57, 58 are fitted with a pair of triangular three-pronged gripper jaws 36, 37 which are similar to those already described in connection with Figures 1 and 2 and the parts of which have received similar reference numerals in Figures 6 and 7 of the drawings. In Figure 7 both gripper jaws are shown in place although the section is taken in such a plane that the web 57 does not appear in Figure 7. The construction of Figures 6 and 7 permits the use of a trolley of the kind described in United States patent application Serial Number 570,007, or in U. S. Patent No. 2,732,088.

The result of the use of these grippers, each provided with three prongs or the equivalent so that they so to speak enclose a tire, is that an accidental gust of wind or bump in the run-way cannot cause the undercarriage to be lifted off the trolley and so be detached therefrom.

I claim:

1. In apparatus for maneuvering aircraft, the combination of a trolley-body having a steering wheel, a steering wheel mounting therefor at one end of said body, supporting wheels spaced apart at the other end thereof, gripper jaws between said supporting wheels having upstanding wheel-engaging surfaces facing one another, lateral projections therefrom below the center line of wheel and other lateral projections above the center line, supporting means on the trolley-body for said gripper jaws which are movable to bring the gripper jaws towards or from one another and also to raise and lower the same, and power means to move said supporting means.

2. Apparatus as claimed in claim 1, wherein the supporting means for the gripper jaws comprises forwardly extending gripper arms movable toward and from one another horizontally and also liftable and the gripper jaws are removably mounted on a plate carried by the arms.

3. Apparatus as claimed in claim 1 wherein said supporting means for the gripper jaws comprise a liftable mounting on the trolley and a ring supported by the liftable mounting, the gripper jaws being removably mounted on the ring.

4. The combination of claim 1 wherein each gripper jaw comprises a flat body having at least three elements extending laterally from one side of each jaw and securing means on the opposite side of said jaw.

5. The combination of claim 4 wherein said supporting means carries an upright plate and said securing means comprises a hook-like member adapted to fit over the upper edge of said plate, and a peg below said hook-like member adapted to coact with a hole in said plate.

References Cited in the file of this patent

UNITED STATES PATENTS

| | | |
|---|---|---|
| 1,964,119 | Hendry | June 26, 1934 |
| 2,287,955 | Zunino | June 30, 1942 |
| 2,732,088 | Arnot | Jan. 24, 1956 |
| 2,739,009 | Phillips | Mar. 20, 1956 |